United States Patent
Nguyen

(10) Patent No.: US 7,590,985 B1
(45) Date of Patent: Sep. 15, 2009

(54) CLUSTER INTER-PROCESS COMMUNICATION TRANSPORT

(75) Inventor: Vy Nguyen, Hayward, CA (US)

(73) Assignee: 3PAR, Inc., Fremont, CA (US)

( * ) Notice: Subject to any disclaimer, the term of this patent is extended or adjusted under 35 U.S.C. 154(b) by 1303 days.

(21) Appl. No.: 10/194,606

(22) Filed: Jul. 12, 2002

(51) Int. Cl.
G06F 15/177 (2006.01)
G06F 9/54 (2006.01)

(52) U.S. Cl. .................. 719/313; 719/315; 709/203; 709/221

(58) Field of Classification Search .......... 719/313, 719/315, 316, 3; 709/203, 221, 226
See application file for complete search history.

(56) References Cited

U.S. PATENT DOCUMENTS

| | | | |
|---|---|---|---|
| 5,230,044 A | 7/1993 | Cao et al. | |
| 5,999,712 A | 12/1999 | Moiin et al. | |
| 6,044,379 A * | 3/2000 | Callsen | 707/103 R |
| 6,108,699 A | 8/2000 | Moiin | 709/221 |
| 6,173,313 B1 * | 1/2001 | Klots et al. | 709/203 |
| 6,374,294 B1 * | 4/2002 | Quirt | 709/221 |
| 6,487,622 B1 | 11/2002 | Coskrey et al. | |
| 6,721,898 B1 * | 4/2004 | Hasha | 714/4 |
| 2001/0056461 A1 | 12/2001 | Kampe et al. | |
| 2002/0016867 A1 | 2/2002 | Kampe et al. | |
| 2002/0042693 A1 | 4/2002 | Kampe et al. | |
| 2002/0049845 A1 * | 4/2002 | Sreenivasan et al. | 709/226 |
| 2004/0078652 A1 * | 4/2004 | Tapper et al. | 714/13 |

OTHER PUBLICATIONS

Windows 2000 Clustering Technologies: Cluster Service Architecture, White Paper, Microsoft Corporation, pp. 1-23.
Werner Vogels et al., "The Design and Architecture of the Microsoft Cluster Service", Paper, 10 pages.

* cited by examiner

*Primary Examiner*—Li B Zhen
(74) *Attorney, Agent, or Firm*—Patent Law Group LLP; David C. Hsia

(57) ABSTRACT

A method for a name mapping module on a node to handle communication between a client process and a server process includes receiving from a client process a process handle and a message for a server process, mapping the process handle to an entry of the server process in a process table, reading the entry to retrieve (1) a node number of a node and (2) a process ID on the node, and sending the message with the process ID to the node. If the server process is not accepting messages, the method further includes waiting for the backup server process to take over for the server process before sending the message. If the server process or the node fails after the message was sent, the method further includes waiting for the backup server process to take over for the server process.

217

25 Claims, 9 Drawing Sheets

Name mapping modules of member nodes when a new node joins the cluster

Name mapping module of a new node that joins the cluster

Name mapping module on a member node with a failing server process

Name mapping modules on all members nodes when a server process fails

CLUSTER INTER-PROCESS COMMUNICATION TRANSPORT

FIELD OF THE INVENTION

This invention relates to a utility storage server having multiple controller nodes, and more particularly to communication between client-server processes on different controller nodes in a cluster.

DESCRIPTION OF RELATED ART

A utility storage server may be defined as any carrier-class storage system that supports multiple users or departments and provisions storage to multiple applications. The utility storage server may feature full fault-tolerance, security, and the ability to charge back individual users or departments for storage usage. To implement fault tolerance, a utility storage server uses clustering of multiple controller nodes to control many disk drives. Clustering is the use of two or more systems to work together to handle variable workloads or to provide continued operation in the event one fails. When a new node joins the cluster (commonly called a "node up event"), cluster software updates the cluster services to the new controller node so the same services can be provided cluster wide. When a node in the cluster fails (commonly called a "node down event"), the cluster software fails over or takes over the cluster services for fault tolerance.

To implement client-server applications in a cluster, there must be a method for a client process on one node to communicate with a server process on another node. A server process's location is identified by a network address of the node running the server process and a port number to connect when using TCP/IP protocol. Client processes usually lookup a name server to get the locations of their server processes. Using this method, a client process must query the name server to update its server process's network address and re-establish the connection if the server process moves to a different node. If a client process cannot communicate with the server process, the client process does not know if the server process is not available or has timed out in the communication network. Furthermore, if the name server dies, client servers must know a secondary name server to lookup. Server processes cannot use the name server to lookup their backups dynamically in order to implement dual tolerant process pairs (e.g., a pair of primary and backup processes). Examples of the name server include DNS and Unix's port mapper. Thus, what is needed is a method that simplifies communication between client-sever processes in a cluster and provides an infrastructure to implement fault tolerant server processes to continuously provide service for client processes.

SUMMARY OF THE INVENTION

In one embodiment, a method for a name mapping module on a node to handle communication between a client process and a server process includes (a) receiving from a client process a process handle and a message for a server process, (b) mapping the process handle to an entry of the server process in a process table, (c) reading the entry to retrieve (1) a node number of a node, (2) a process ID on the node, and (3) a process state of the server process, and (d) determining if the server process is accepting messages according to the process state.

If the server process is accepting messages, the method further includes sending the message with the process ID to the node. If the server process is not accepting messages, the method further includes determining if the server process has a backup server process. If the server process has a backup server process, the method further includes waiting for the backup server process to take over for the server process.

After said sending the message, the method further includes determining if the server process or the node has failed. If the server process or the node has failed, the method further includes determining if the server process has a backup server process. If the server process has a backup server process, the method further includes waiting for the backup server process to take over for the server process.

DETAILED DESCRIPTION

Figure 1A:
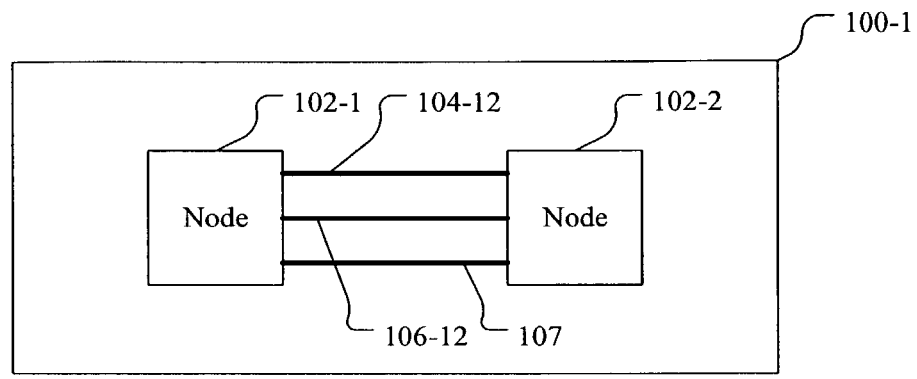
FIGS. 1A and 1B illustrate controller nodes of a utility storage server in two embodiments.

FIG. 1A illustrates controller nodes 102-1 and 102-2 of a utility storage server in one embodiment. Each controller node connects a host to a drive chassis housing hard disk drives. Nodes 102-1 and 102-2 can form a cluster 100-1 to provide disk access and failover protection. Controller nodes 102-1 and 102-2 are connected to each other by a primary link 104-12 and a backup link 106-12 in a one-to-one configuration. Controller nodes 102-1 and 102-2 are also connected by a serial bus 107 (e.g., an I2C bus). Each controller node is able to detect the power status (e.g., power on or power off) of any other node through primary link 104-12. Each controller node is able to reset any other node (e.g., a cold reboot) through bus 107. For more information on the utility storage server, please see U.S. Pat. No. 6,658,478, entitled "Data Storage System,", and U.S. patent application Ser. No. 09/883,681, entitled "Node Controller For A Data Storage System,", which are incorporated by reference in their entirety.

Figure 1B:
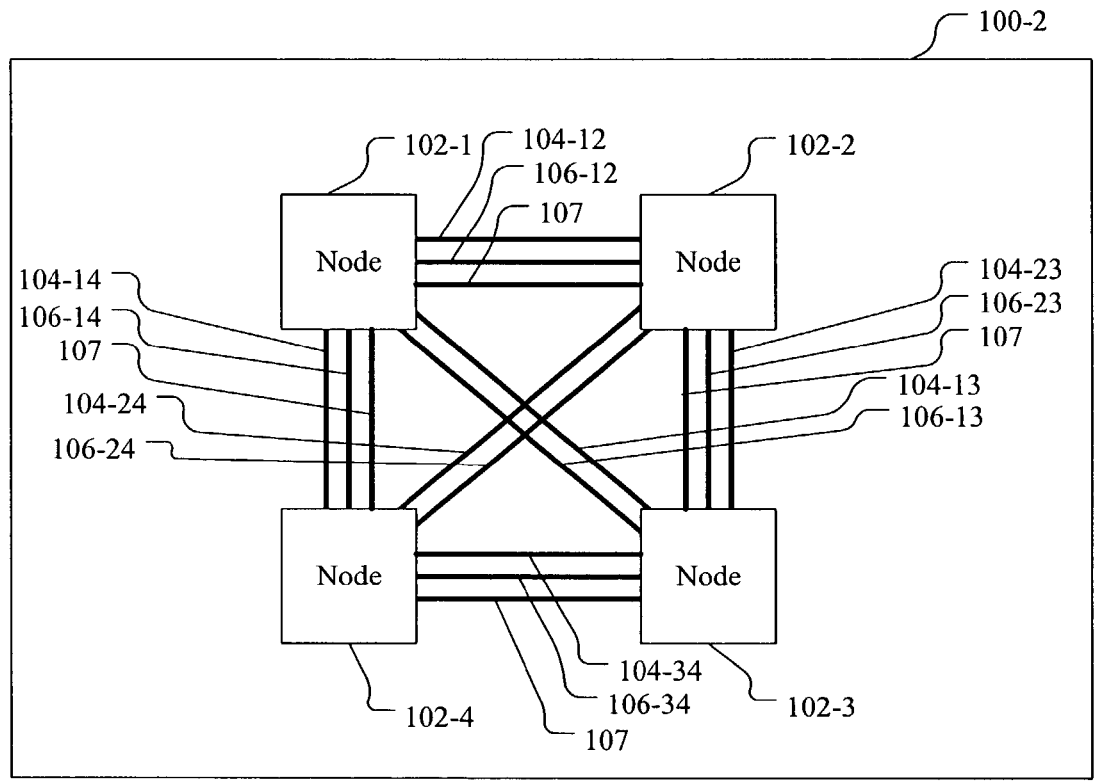

In other embodiments, the utility storage server contains a greater number of controller nodes that can form a cluster. For example, FIG. 1B illustrates four controller nodes 102-1, 102-2, 102-3, and 102-4 that form a cluster 100-2 in one embodiment. Each controller node is connected to the other controller nodes through primary and backup links in a one-to-one configuration. Specifically, (1) controller nodes 102-1 and 102-2 are connected by primary links 104-12 and backup link 106-12, (2) controller nodes 102-1 and 102-3 are connected by primary link 104-13 and backup link 106-13, (3) controller nodes 102-1 and 102-4 are connected by primary link 104-14 and backup link 106-14, (4) controller nodes 102-2 and 102-3 are connected by primary link 104-23 and backup link 106-23, (5) controller nodes 102-2 and 102-4 are connected by primary link 104-24 and backup link 106-24, and (6) controller nodes 102-3 and 102-4 are connected by primary link 104-34 and backup link 106-34. Additional, all the controller nodes are connected in series by bus 107. In another embodiment, the utility storage server contains eight controllers connected to each other through primary and backup links in a one-to-one configuration, and by bus 107 in a serial configuration.

Figure 1C:
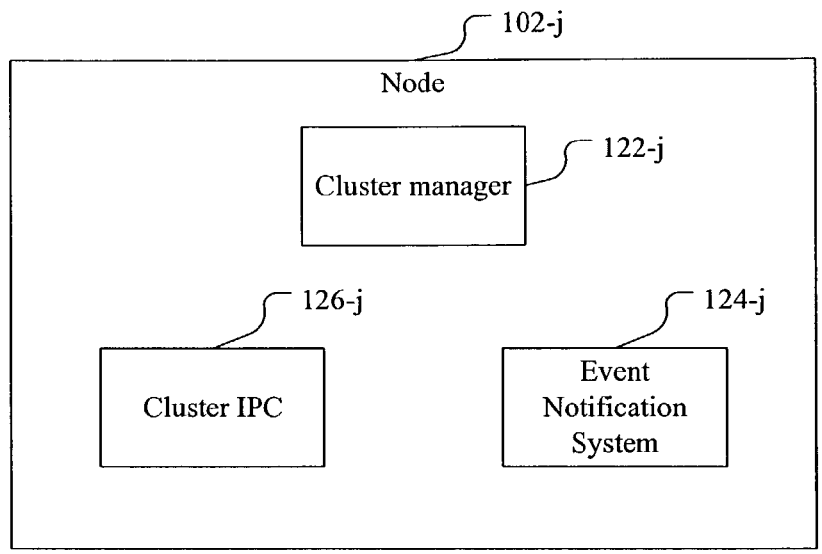
FIG. 1C illustrates cluster software in a controller node in one embodiment.

FIG. 1C illustrates cluster software on a controller node 102-$j$ (where "j" is a variable) in one embodiment. The cluster software includes a cluster manager 122-$j$, a cluster event notification system 124-$j$, and a cluster inter-process communication (IPC) module 126-$j$. Cluster manager 122-$j$ implements a protocol for new nodes to join a cluster of nodes. Cluster manager 122-$j$ is described in detail in U.S. Pat. No. 6,965,957, entitled "Automatic Cluster Join Protocol,", which is incorporated by reference in its entirety. Cluster event notification system 124-$j$ implements a protocol for a node to handle cluster events. Cluster event notification system 124-$j$ is described in detail in U.S. patent application Ser. No. 10/194,710, entitled "Cluster Event Notification System,", which is incorporated by reference in its entirety. IPC module 126-$j$ implements a protocol for client-server process communication. IPC module 126-$j$ is described in detail below.

Figure 3:
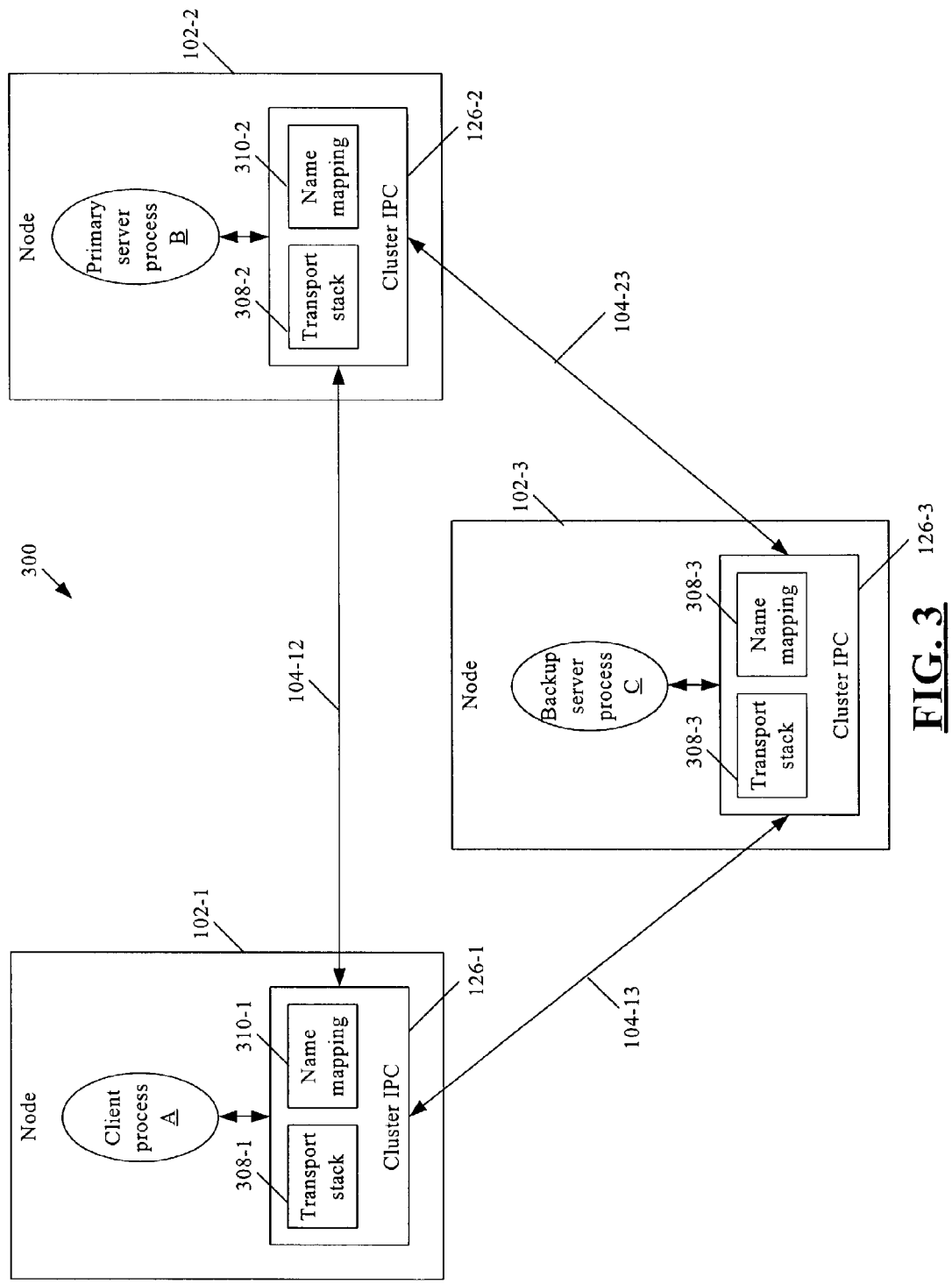
FIG. 3 illustrates three exemplary controller nodes each having a cluster inter-process communication (IPC) module with a name mapping module in one embodiment.

FIG. 3 illustrates a cluster 300 that includes nodes 102-1, 102-2, and 102-3 that are connected by primary links 104-12, 104-23, and 104-13 in one embodiment. For clarity, the backup links and the serial bus between the nodes are not shown in FIG. 3. Nodes 102-1, 102-2, and 102-3 include IPC modules 126-1, 126-2, and 126-3 respectively. For clarity, the cluster managers and the event notification systems are not shown in FIG. 3. Process A on node 102-1 (e.g., a client process), process B on node 102-2 (e.g., a primary server process), and process C on node 102-3 (e.g., a backup server process) use IPC modules 126-1, 126-2, and 126-3 to communicate with each other, respectively. In some applications, two or more of processes A, B, and C may be located on the same node and use the IPC module of that node to communicate with each other.

IPC module 126-1 includes a name mapping module 310-1. A client process communicates with a server process by sending a message with a process handle to name mapping module 310-1. Name mapping module 310-1 maps the process handle to the server process that should receive the message. Thus, client process does not need to know the node location and the process ID of the server process.

Figure 4:
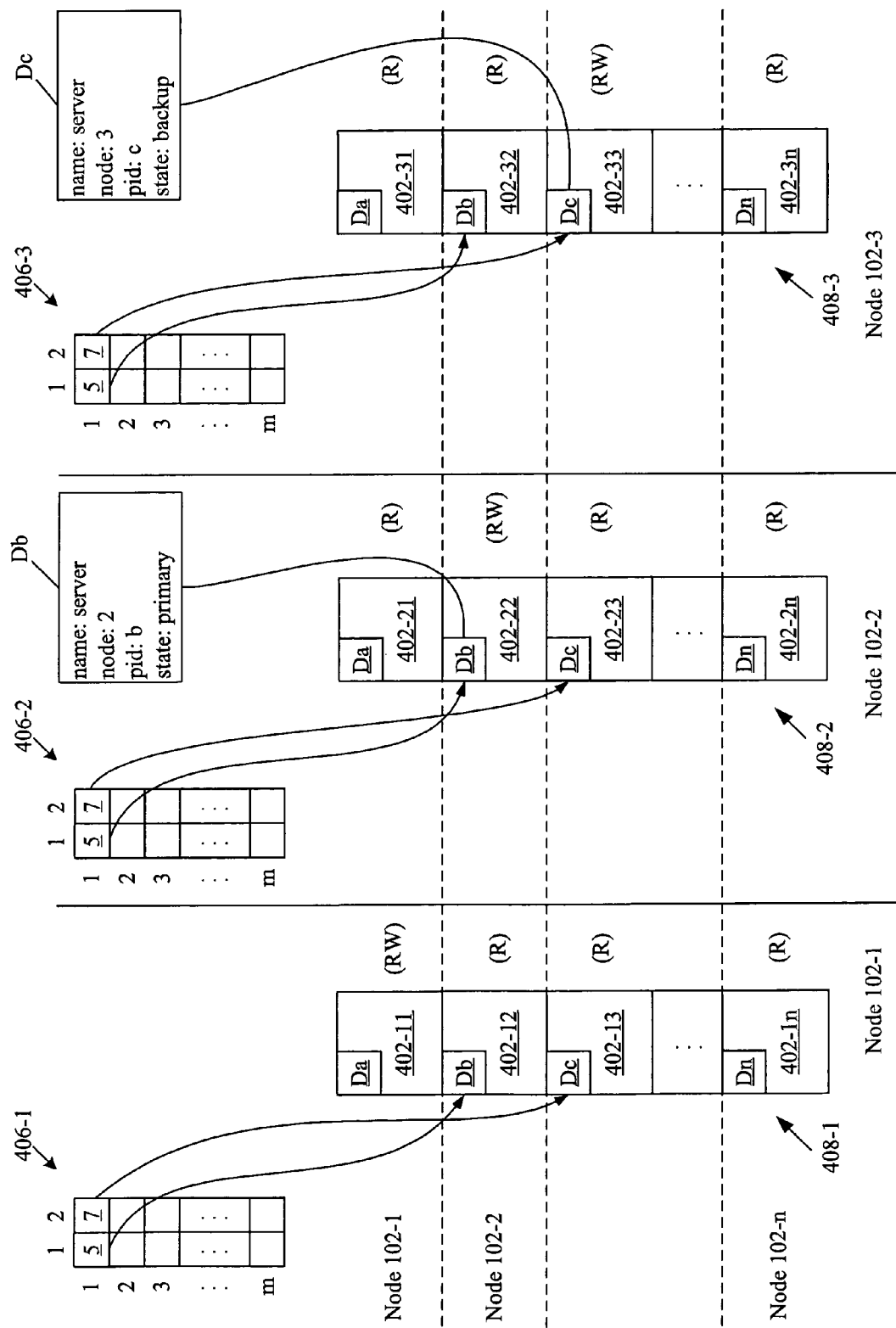
FIG. 4 illustrates handle indices and process tables created by the name mapping modules of multiple member nodes in one embodiment.

Name mapping module 310-1 generates and manages a handle table 406-1 (FIG. 4) and a process table 408-1 (FIG. 4). Handle table 406-1 includes multiple rows and each row is divided into a first column and a second column. The first column stores the location of an entry in process table 408-1 for a primary server process, and the second column stores the location of an entry in process table 408-1 for a backup server process to the primary server process. Each row index to handle table 406-1 is a process handle to a primary server process and a backup server process. For example, a process handle 1 corresponds to row 1 in handle table 406-1. Row 1 stores (1) in the first column a location 5 of an entry Db in table 408-1 for primary server process B, and (2) in the second column a location 7 of an entry Dc in table 408-1 for a secondary server process C.

The entries in process table 408-1 store information that name mapping module 310-1 uses to send the message from the client process to the server process. Each entry includes a process name, a node number, a process ID, and a process state (e.g., primary, backup, or not accepting messages). Name mapping module 310-1 uses the node number to identify the node on which the server process resides, and the process ID to identify the server process on that node.

IPC module 126-1 further includes a transport stack 308-1 (e.g., a network transport). Transport stack 308-1 provides the software communication layers between the nodes. Similarly, IPC modules 126-2 and 126-3 include name mapping modules 310-2 and 310-3 and transport stacks 308-2 and 308-3, respectively.

FIG. 4 illustrates a combined view of multiple handle tables 406-1 to 406-3 and process tables 408-1 to 408-3 on nodes 102-1 to 102-3 in one embodiment. Each of the process tables is divided into multiple memory regions. For example, table 408-1 is divided into memory regions 402-11, 402-12, 402-13, . . . , 402-1$n$ (where "n" is a variable); process table 408-2 is divided into memory regions 402-21, 402-22, 402-23, . . . , 402-2$n$; and process table 408-3 is divided into memory regions 402-31, 402-32, 402-33, . . . 402-3$n$.

Each memory region is assigned to one of the member nodes in the cluster and only the name mapping module of that member node can write to the assigned memory region. For example, only name mapping module 310-1 of member node 102-1 can write to memory regions 402-11 to 402-31; only name mapping module 310-2 of member node 102-2 can write to memory regions 402-12 to 402-32; and only name mapping module 310-3 of member node 102-3 can write to memory regions 402-13 to 402-33. The name mapping module of one member node writes to its assigned memory regions on the other nodes by instructing the name mapping modules on the other nodes to write to its assigned memory regions.

The name mapping module of each member node can read all the memory regions in its process table. For example, name mapping module 310-1 of member node 102-1 can read all the memory regions in table 408-1, name mapping module 310-2 of member node 102-2 can read all the memory regions in table 408-2, and name mapping module 310-3 of member node 102-3 can read all the memory regions in name table 408-3.

Figure 2A:
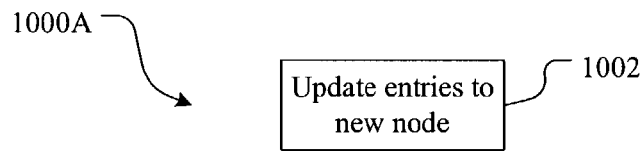
FIG. 2A illustrates a flowchart of a method for name mapping modules of member nodes to respond to a new node that joins the cluster in one embodiment.
Figure 2B:
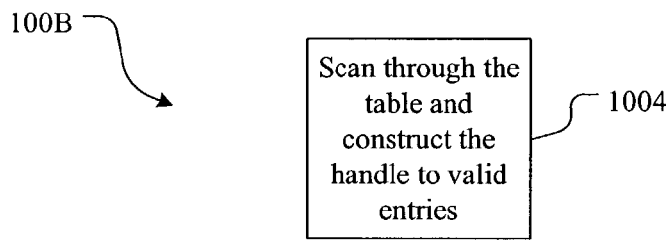
FIG. 2B illustrates a flowchart of a method for a name mapping module of a new node that joins the cluster to prepare for communication with processes at other member nodes in one embodiment.
Figure 5:
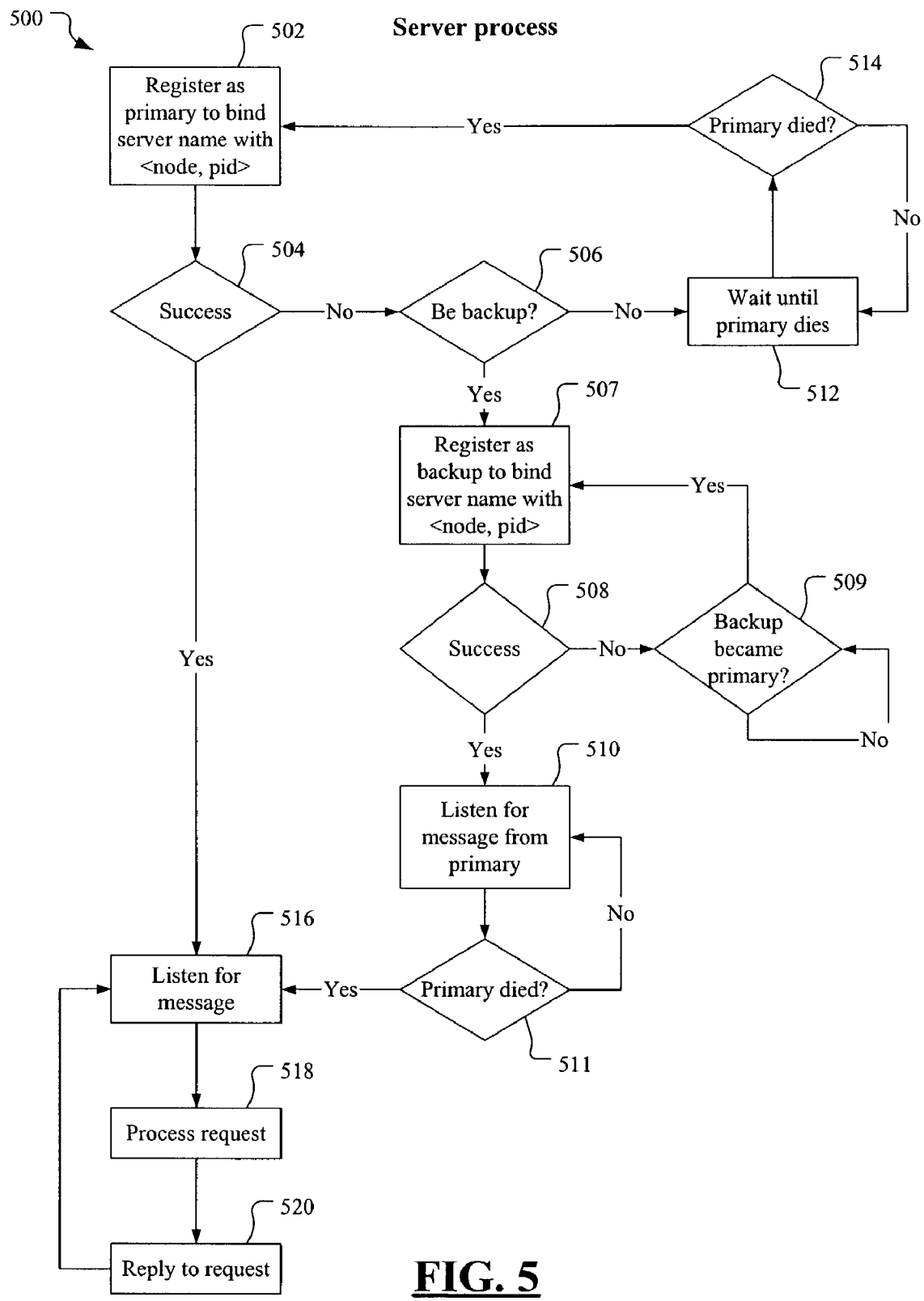
FIG. 5 illustrates a flowchart of a method for a server process to communicate with a client process in one embodiment.
Figure 6:
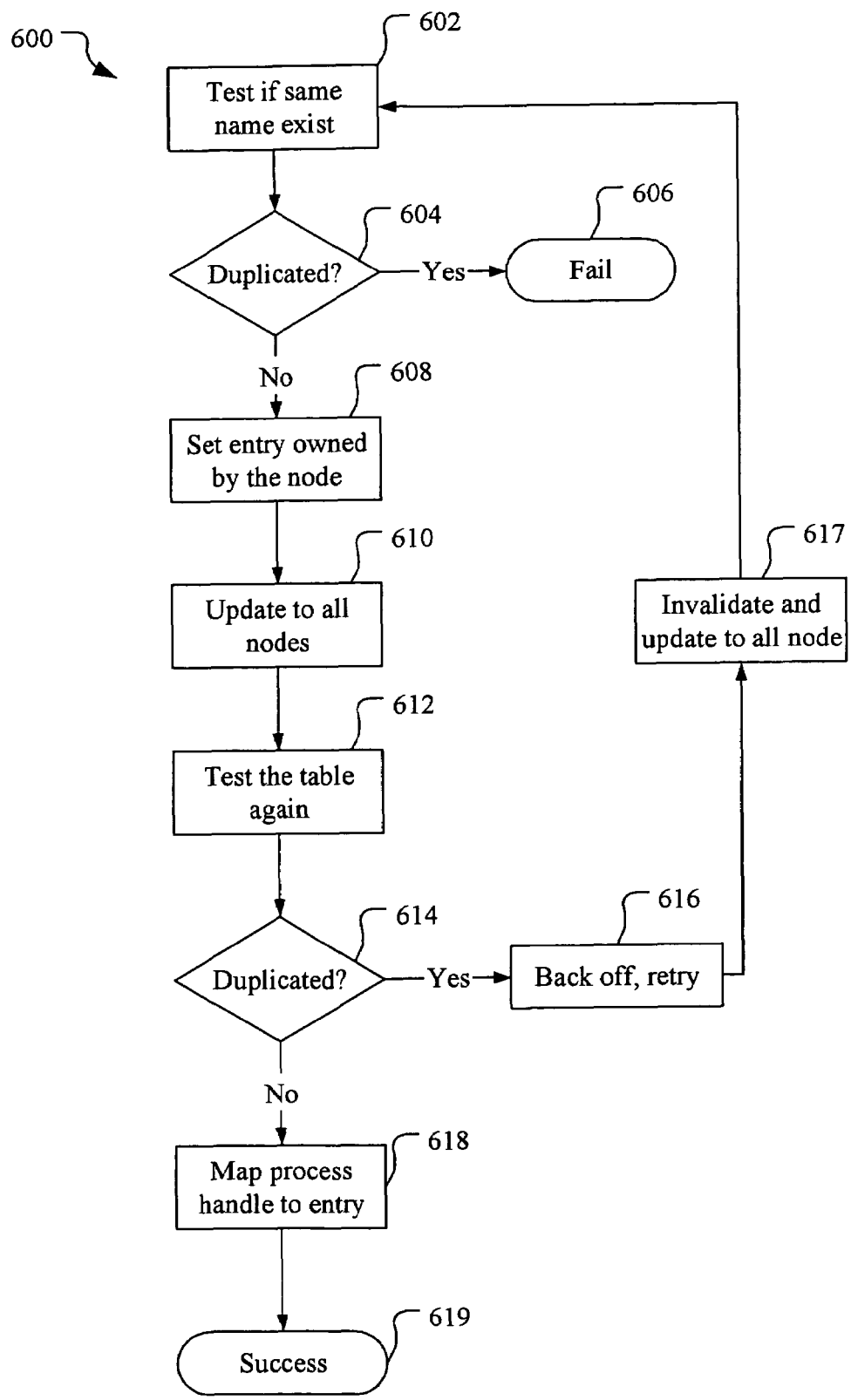
FIG. 6 illustrates a flowchart of a method for a server process to register as a primary or backup server process with a name mapping module in one embodiment.
Figure 7:
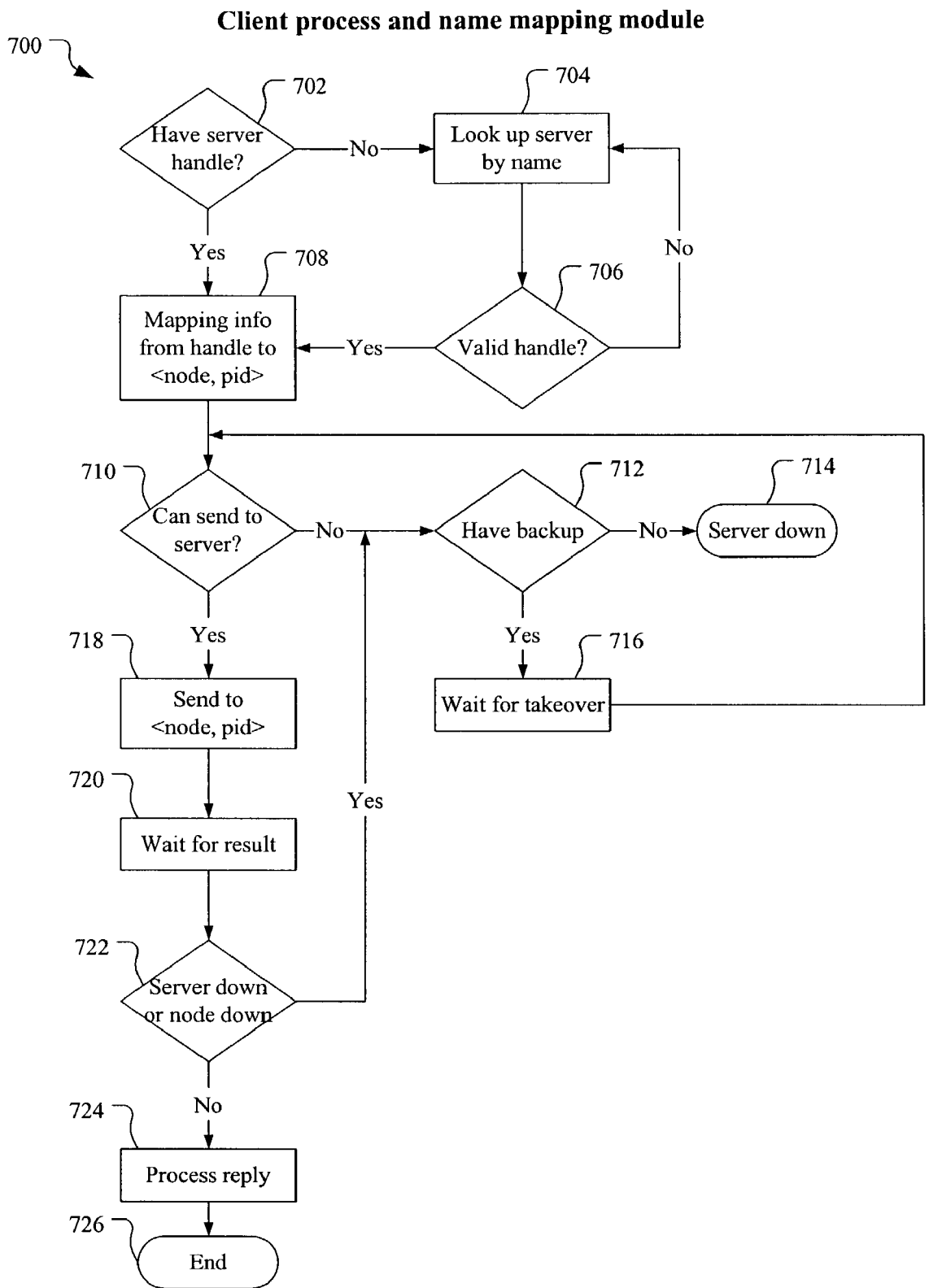
FIG. 7 illustrates a flowchart of a method for a client process to communicate with a server process using a name mapping module in one embodiment.
Figure 8A:
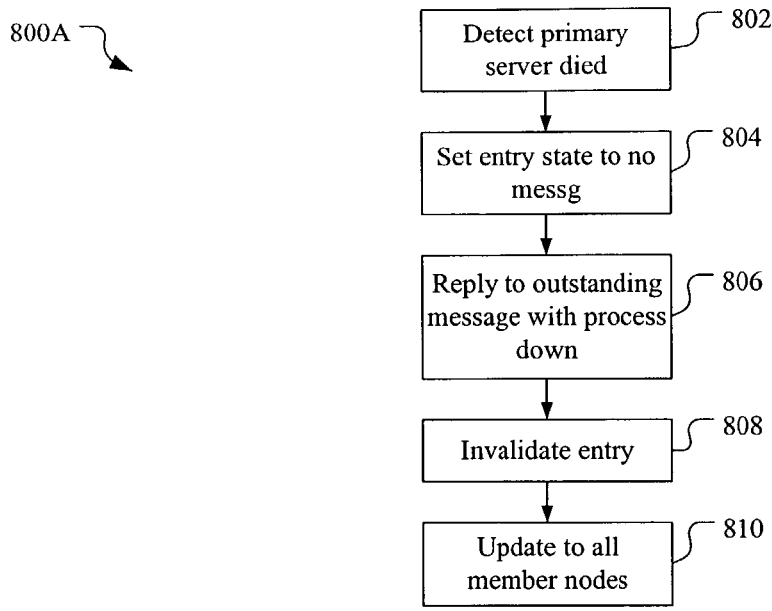
FIG. 8A illustrates a flowchart of a method for a name mapping module on a member node to respond to a failing server process on that member node in one embodiment.
Figure 8B:
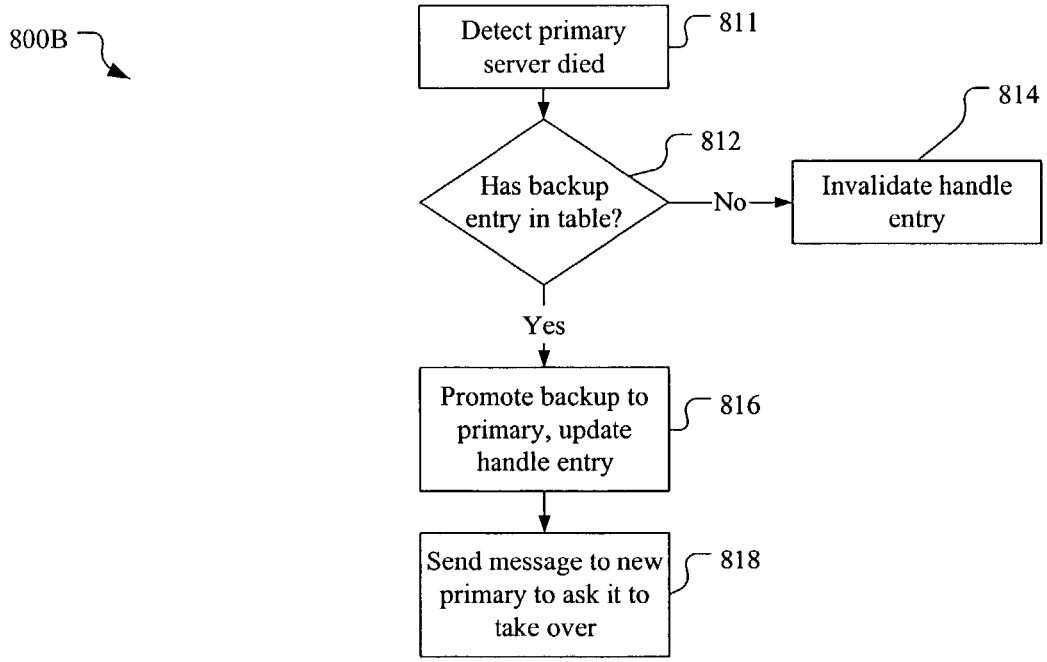
FIG. 8B illustrates a flowchart of a method for name mapping modules on all the member nodes to respond to a failing server process on one of the member nodes in one embodiment.
Figure 9:
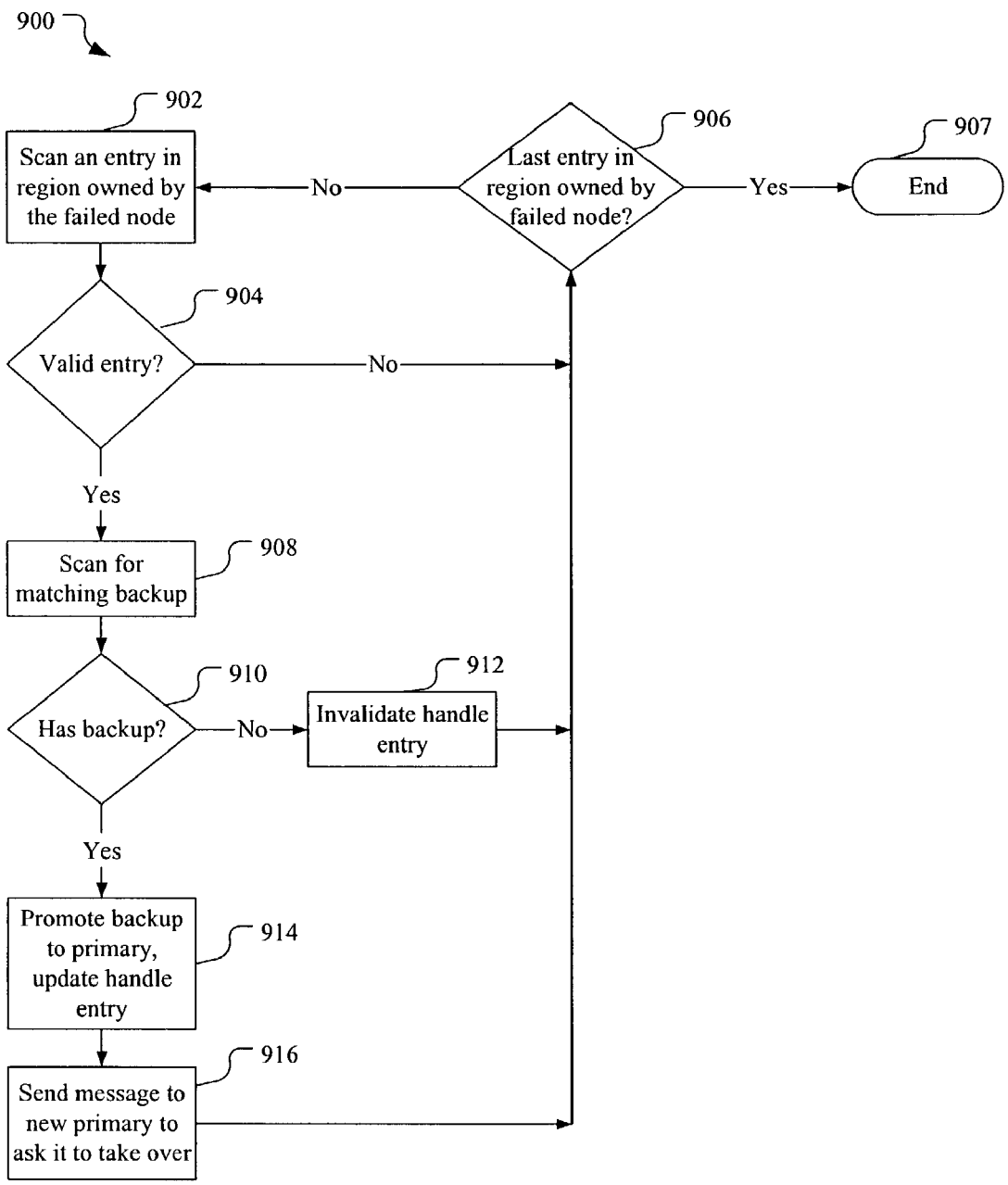
FIG. 9 illustrates a flowchart of a method for name mapping modules on member nodes to respond to a failing member node in one embodiment.

The interactions of a client process, a primary server process, a backup server process, and the name mapping modules in cluster process communication are explained in reference to FIGS. 5, 6, 7, 8A, 8B, 9, 2A, and 2B. FIG. 5 illustrates a method for a server process to register with a name mapping module in order to communicate with a client process and provide fault tolerance. FIG. 6 illustrates a method for a name mapping module to register a server process. FIG. 7 illustrates a method for a name mapping module to facilitate communication between a client process and a server process and provide fault tolerance. FIGS. 8A and 8B illustrate methods for name mapping modules on nodes to respond to a failing server process on one node to provide fault tolerance. FIG. 9 illustrates a method for name mapping modules on nodes to respond to a failing node to provide fault tolerance. FIGS. 2A and 2B illustrate methods for name mapping modules on nodes to respond to a new node in the cluster to provide communication to processes on the new node.

FIG. 5 illustrates a method 500 for a server process on a node to communicate with a client process on another node in one embodiment. In one example, server process B on node 102-2 attempts to communicate with client process A on node 102-1.

In action 502, server process B registers as a primary server process with name mapping module 310-2 to bind a server name to a node number, a process ID, and a primary state in table 408-2. The server name identifies the service provided by a server process. In other words, server processes with the same names provide the same type of service to client processes. In one embodiment, name mapping module 310-2 uses method 600 in FIG. 6 (described later) to register server process B as a primary server process.

In action 504, server process B determines whether it has successfully registered as a primary server process with name mapping module 310-2. If so, action 504 is followed by action 516. If server process B has not successfully registered as a primary server process, action 504 is followed by action 506.

In action 506, server process B determines if it is configured to be an active backup to the primary server process that has registered the server name. If server process B is configured to be an active backup to the primary server process, action 506 is followed by action 507. Otherwise server process B is configured to be a passive backup to the primary server process and action 506 is followed by action 512.

In action 507, server process B registers as a backup process with name mapping module 310-2 to bind its server name to a node number, a process ID, and a backup state in table 408-2. In one embodiment, name mapping module 310-2 uses method 600 in FIG. 6 (described later) to register server process B as a backup server process.

In action 508, server process B determines whether it has successfully registered as a backup server process with name mapping module 310-2. If so, action 508 is followed by action 510. If server process B has not successfully registered as a backup server process, action 508 is followed by action 509.

In action 509, server process B determines whether the registered backup server process has become a new primary server process because the old primary process has failed. If so, action 509 is followed by action 507 where server process B attempts again to register as a backup server process. If the registered backup server process has not become the primary server process, action 509 repeats and server process B waits until the registered backup server process becomes the primary server process. In one embodiment, server process B knows the registered backup process has become the primary server process when the process state of the registered backup process is changed from backup to primary. Action 509 corresponds to action 816 in FIG. 8B by a name mapping module (described later).

In action 510, server process B listens for messages from the primary server process. These messages include the actions of the primary server process. As the active backup, server process B monitors the actions of the primary server process. When the primary server process fails, server process B takes over and resumes the actions of the primary server process.

In action 511, server process B determines if the primary server process has failed. If so, action 511 is followed by action 516. If the primary server process has not failed, action 511 is followed by action 510 and server process B continues to wait until the primary server process fails. In one embodiment, server process B knows the primary server process has failed when name mapping module 310-2 sends a message to server process B to ask server process B to take over the services provided by the primary server process. Action 511 corresponds to action 818 in FIG. 8B by a name mapping module (described later).

In action 512, server process B waits for the primary server process to fail. As the passive backup, server process B does not monitor the actions of the primary server process. When the primary server process fails, server process B takes over at the start regardless of the last action of the primary server process.

In action 514, server process B determines if the primary server process has failed. Action 514 corresponds to action 810 of FIG. 8A where a name mapping module on another node instructs name mapping module 310-2 to erase the entry of a failing primary server process. Name mapping module 310-2 thus knows a specific primary server process has failed and informs the server processes on node 102-2. If so, action 514 is followed by action 502 where server process B again tries to register as the primary server process. If the primary server process has not failed, action 514 is followed by action 512 and server process B waits until the primary server process fails.

In action 516, primary server process B listens for messages from a client process (e.g., client process A on node 102-1) through transport stack 308-2. In action 518, primary server process B processes the messages from client process A. In action 520, server process B replies to the messages from client processes A though transport stack 308-2. Action 520 is followed by action 516 where primary server process B continues to communicate with client process A.

FIG. 6 illustrates a method 600 for a name mapping module to register a server process in process table in two embodiments. In one embodiment, name mapping module 310-2 registers server process B as a primary server process in process table 408-2 in response to action 502 described. In another embodiment, name mapping module 310-2 registers server process B as a backup server process in process table 408-2 in response to action 507 described above.

In action 602, name mapping module 310-2 reads process table 408-2 to test if the server name of process B exits in process table 408-2. In action 604, name mapping module 310-2 determines if the server name of process B exists in process table 408-2. In other words, name mapping module 310-2 determines if the server name of process B is duplicated in process table 408-2. When the server name is duplicated, another server process has previously registered the server name in the same process state (primary or backup) and is now the registered server process under that server name and that process state. If the server name is duplicated, action 604 is followed by action 606, which ends method 600 because server process B fails to register as a primary or backup server process. If the server name is not duplicated, action 604 is followed by action 608.

In action 608, name mapping module 310-2 sets (e.g., writes) an entry Db (FIG. 4) in memory region 402-22 of table 408-2 owned by node 102-2. Entry Db includes a server name, a node number, a process ID (pid), and a process state. If server process B is registering as a primary server process, the process state would be primary. If server process B is registering as a backup server process, the process state would be backup.

In action 610, name mapping module 310-2 updates (e.g., writes) the same entry Db into its memory regions in the process tables at the other nodes. For example, name mapping module 310-2 writes entry Db into memory region 402-12 in table 408-1 and memory region 402-32 in table 408-3. In response, each of the name mapping modules on the other nodes maps a process handle in its handle table to entry Db in its process table. Depending if server process B is registering as a primary or a backup server process, the location of entry Db is written to either column 1 or column 2 in the handle table.

In action 612, name mapping module 310-2 again reads table 408-2 to test if the server name of process B exits. In action 614, name mapping module 310-2 again determines if the server name of process B is duplicated in table 408-2. If the server name is duplicated, action 614 is followed by action 616. If the server name is not duplicated, action 614 is followed by action 618. The double testing in actions 602 and 612 ensures that any two server processes cannot be both registered as the same primary or a backup server process.

In action 616, name mapping module 310-2 backs off the registration process and waits for server process B to register again after a timeout. In one embodiment, server processes at different nodes are assigned different timeout periods so any collision in the registration process will be resolved.

In action 617, name mapping module 310-2 invalidates (e.g., erases) entry Db in memory region 402-22 and updates (e.g., erases) entries Db in its memory regions in the process tables at the other nodes. Action 617 is followed by action 602 and method 600 cycles as described above.

In action 618, name mapping module 310-2 maps process handle 1 in handle table 406-2 to entry Db in table 408-2. If server process B is registering as a primary server process, name mapping module 310-2 writes location 5 of entry Db in row 1, column 1. If server process B is registering as a backup server process, name mapping module 310-2 writes location 7 of entry Db in row 1, column 2. Process handle 1 is persistent and uniquely identifies a service provided by primary server process B, or by backup server process C when server process B fails, in node 102-2.

In action 619, name mapping module 310-2 ends method 600 because server process B has successfully registered as a primary or backup server process. In other words, server process B is now the primary or backup server process under a particular server name.

FIG. 7 illustrates a method 700 for a client process on a node to communicate with a server process on another node in one embodiment. In one example, client process A on node 102-1 attempts to communicate with a primary server process B on node 102-2 in the following manner.

In action 702, client process A determines if it has a process handle for server process B. If so, action 702 is followed by action 708. If client process A does not have the process handle for server process B, action 702 is followed by action 704. Client process A does not have the process handle of server process B if this is client process A's first attempt to communicate with server process B.

In action 704, client process A queries name mapping module 310-1 for the process handle of server process B. In response, name mapping module 310-1 uses the server name of process B to lookup entry Db in table 408-1 and then uses the memory location of entry Db to lookup process handle 1.

In action 706, name mapping module 310-1 determines if server process B has a valid process handle 1. If so, name mapping module 310-1 provides process handle 1 for future use and action 706 is followed by 708. If server process B does not have a valid handle, action 706 is followed by action 704 and method 700 cycles until server process B has a valid handle. In one embodiment, server process B has a valid handle if process handle 1 can be looked up in action 704.

In action 708, client process A uses process handle 1 to communicate with server process B using name mapping module 310-1. Specifically, client process A sends a message with process handle 1 to name mapping module 310-1. Name mapping module 310-1 uses handle table 406-1 to map process handle 1 to location 5 of entry Db in process table 408-1, and then looks up the node number and the process ID in entry Db.

In action 710, name mapping module 310-1 determines if a message can be sent to server process B. If so, action 710 is followed by action 718. If a message cannot be sent to server process B, action 710 is followed by action 712. A message cannot be sent to server process B when entry Db indicates that server process B cannot accept any message in its current state. In one embodiment, server process B cannot accept any message in its current state if server process B is in a transition to shutdown after it has failed (e.g., as described later in reference to FIG. 8A).

In action 712, name mapping module 310-1 determines if server process B has a backup. If so, action 712 is followed by action 716. If server process B does not have a backup, action 712 is followed by action 714. In one embodiment, name mapping module 310-1 determines if server process B has a backup by mapping process handle 1 to a backup location 7 of entry Dc in table 408-1. If entry Dc contains information about backup server process C to primary server process B, then server process B has a backup.

In action 714, server process B has failed without any backup. This ends client service A's attempt to communicate with server process B. Depending on the application, the cluster may have additional procedures to respond to the failure of server process B.

In action 716, name mapping module 310-1 waits for the backup server process to take over for the primary server process B. Action 716 is followed by action 710 and method 700 cycles until backup server process C takes over the service provided by primary service process B.

In action 718, name mapping module 310-1 sends the message from client process A to server process B through transportation stack 308-1 with the appropriate node number and process ID determined in action 708. In action 720, client process A waits for a reply from server process B.

In action 722, name mapping module 310-1 determines if server process B has failed or node 102-2 on which server process B resides has failed. If so, action 722 is followed by action 712 described above. If server process B has not failed, action 722 is followed by action 724. Name mapping module 310-1 will be notified by name mapping module 310-2 when server process B fails. This corresponds to action 806 (FIG. 8A) of a name mapping module on a node with a failing server process. Name mapping module 310-1 will be notified by the event notification system on node 102-1 when node 102-2 fails.

In action 724, client process A processes any reply from server process B. Action 724 is followed by action 726, which ends client service A's communication with server process B.

FIG. 8A illustrates a flowchart of a method 800A for a name mapping module of a member node to respond to a failing server process on the member node in one embodiment. In one example, name mapping module 310-2 on node 102-2 responds to a failing server process B on node 102-2 in the following manner.

In action 802, name mapping module 310-2 detects that server process B on node 102-2 has failed. The operating system of node 102-2 notifies name mapping module 310-2 when server process B fails. In action 804, name mapping module 310-2 writes to entry Db of server process B in table 408-2 to set the state to not accepting any message. This indicates that server process B is no longer accepting any message from client processes (e.g., client process A).

In action 806, name mapping module 310-2 replies to all the outstanding messages that server process B received prior to failing. Name mapping module 310-2 sends a server process B down message to the client processes that sent the outstanding messages.

In action 808, name mapping module 310-2 invalidates (e.g., erases) entry Db in process table 408-2 of node 102-2. In action 810, name mapping module 310-2 updates (e.g., erases) entries Db of server process B in the process tables of the other member nodes (e.g., tables 408-1 and 408-3). Thus, the process handles for server process B at all the nodes would not be mapped to the failing server process B.

FIG. 8B illustrates a flowchart of a method 800B for the name mapping modules of all the member nodes, including the member node having the failing server process, to respond to the failing server process in one embodiment. In one example, the name mapping module 310-3 of member node 102-3 responds to the failing server process B on member node 102-2 in the following way.

In action 811, name mapping module 310-3 detects that server process B has failed. Name mapping module 310-3 knows that server process B has failed when name mapping module 310-2 instructs name mapping module 310-3 to erase entry Db of server process B in table 408-3 in action 810 (FIG. 8A).

In action 812, name mapping module 310-3 determines if the failing server process B has a backup listed in its memory region 402-33 in its process table 408-3. If so, action 812 is followed by action 816. If the failing server process B does not have a backup listed in memory region 402-33 in process table 408-3, action 812 is followed by action 814. Please note that there can only be one registered backup server process and only one member node will have that backup server process in its memory region in the process tables because of the registration process described in FIG. 6.

Similarly described above, name mapping module 310-3 determines if server process B has a backup by mapping process handle 1 to a backup location 7 of entry Dc in table 408-1. If entry Dc contains information about backup server process C, then server process B has a backup.

In action 814, name mapping module 310-3 invalidates location 5 of server process B in row 1 of handle table 406-3. Thus, process handle 1 would not be mapped to the failing server process B at node 102-2.

In action 816, name mapping module 310-3 promotes a backup server process C as the new primary server process by changing the state from backup to primary in entry Dc of backup server process C. Name mapping module 310-3 also updates handle table 406-3 by writing location 7 of entry Dc in row 1, column 1.

In action 818, name mapping module 310-3 sends a message to the new primary server process C to take over for the failing primary server process B.

FIG. 9 illustrates a flowchart of a method 900 for the name mapping modules of member nodes to update their handle indices and process tables in response to a failed member node. The event notification system on each member node will send a node down messages to the name mapping module on the member node when one of the member nodes fails. In one example, name mapping module 310-3 of node 102-3 responds to a failed member node 102-2 in the following manner.

In action 902, name mapping module 310-3 reads an entry (e.g., entry Db) in memory region 402-32 owned by failing member node 102-2. In action 904, name mapping module 310-3 determines if entry Db is valid. Entry Db is valid if it contains the server name. If so, action 904 is followed by action 908. If entry Db is not valid, action 904 is followed by action 906.

In action 906, name mapping module 310-3 determines if there is another entry owned by the failing member node 102-2. If so, action 906 is followed by action 902 where name mapping module 310-3 reads another entry owned by failing member node 102-2. If there is not another entry owned by the failing member node 102-2, action 906 is followed by action 907, which ends method 900.

In action 908, name mapping module 310-3 checks to see if the primary server process B in entry Db has a backup server process (e.g., backup server process C). Name mapping module 310-3 uses process handle 1 of primary server process B to look up location 7 of an entry Dc for backup server process C in handle table 406-3. Specifically, name mapping module 310-3 looks up the row indicated by process handle 1 and then the second column of that row for location 7. Name mapping module 310-3 then looks up location 7 in process table 408-3 for entry Dc. If the server name of backup server process C in entry Dc is the same as the server name of primary server process B in entry Db, then name mapping module 310-3 knows that primary server process B has a backup server process C.

In action 910, name mapping module 310-3 determines if primary server process B in entry 402-32 has a backup server process. If so, action 910 is followed by action 914. If primary server process B in entry 402-32 does not have a backup server process, action 910 is followed by action 912.

In action 912, name mapping module 310-3 invalidates location 5 of primary server process B in row 1, column 1 of handle table 406-3. Thus, server handle 1 would not be mapped to primary server process B in the failing member node 102-2. Action 912 is followed by action 906 described above.

In action 914, name mapping module 310-3 promotes backup server process C as the primary server process by changing the state from backup to primary in entry Dc of backup server process C. Name mapping module 310-3 also updates handle table 406-3 so server handle 1 points to location 7 of entry Dc of the new primary server process C.

In action 916, name mapping module 310-3 sends a message to the new primary server process C to take over for the old primary server process B in the failing member node 102-2. Action 916 is followed by action 906 described above.

FIG. 2A illustrates a flowchart of a method 1000A for name mapping modules of member nodes to prepare for communication between processes when a new node joins the cluster. In one example, name mapping module 310-2 of member node 102-2 responds to a new node 102-3 in the following manner. In action 1002, name mapping module 310-2 updates (e.g., writes) entries in its memory region 402-32 in process table 408-3 of new node 102-3.

FIG. 2B illustrates a flowchart of a method 1000B for a new node to prepare for communication between processes when the new node joins a cluster. In one example, name mapping module 310-3 of a new node 102-3 prepares for process communication in the following manner. In action 1004, name mapping module 310-3 reads its process table 408-3 after all the name mapping modules of the members nodes have written to their memory regions. Name mapping module 310-3 then constructs a handle table 406-3 for valid entries in the process table 408-3.

Various other adaptations and combinations of features of the embodiments disclosed are within the scope of the invention. Numerous embodiments are encompassed by the following claims.

What is claimed is:

1. A computer implemented method on a first node for communication between processes, comprising:
   determining if a first server name of a first server process on the first node exists in a plurality of entries in a process table on the first node;
   if the first server name is not in the entries in the process table, writing a first entry with (a) the first server name, (b) a first process ID of the first server process, and (c) a first process state of the first server process in (1) the process table and (2) process tables on other nodes;
   determining again if the first server name exists in one of the entries excluding the first entry in the process table;
   if the first server name is not in one of the entries excluding the first entry:
      writing a first location of the first entry in a first row of a handle table on the first node, wherein a first row index to the first row is a first process handle for the first server process; and
      informing the first server process that the first server process is registered.

2. The method of claim 1, further comprising:
   receiving a second server name from a client process;
   looking for a second entry storing the second server name in the process table, the second entry comprising (1) the second server name, (2) a second process ID of a second server process on a second node, and (3) a second process state of the second server process, wherein the second entry is located at a second location in the process table;
   looking for a second row storing the second location in the handle table, wherein a second row index to the second row is a second process handle for the second server process; and
   providing the second process handle to the client process for communication with the second server process.

3. The method of claim 2, further comprising:
   receiving from the client process the second process handle and a message for the second server process;
   mapping the second process handle to the second row in the handle table;
   reading the second row to retrieve the second location;
   mapping the second location to the second entry in the process table;
   reading the second entry to retrieve the second process ID and the second process state of the second server process on the second node;
   determining if the second server process is accepting messages according to the second process state; and
   if the second server process is accepting messages, sending the message with the second process ID to the second node.

4. The method of claim 3, further comprising, if the second server process is not accepting messages,
   determining if the second server process has a backup server process; and
   if the second server process has a backup server process, waiting for the backup server process to take over for the second server process.

5. The method of claim 3, after said sending the message, further comprising:
   determining if the second server process or the second node has failed;
   if the second server process or the second node has failed, determining if the second server process has a backup server process; and
   if the second server process has a backup server process, waiting for the backup server process to take over for the second server process.

6. The method of claim 3, further comprising:
   detecting the first server process has failed;
   setting the first process state in the process table on the first node to not accept any message;
   setting the first process state in the process tables on the other nodes to not accept any message;
   reply to any outstanding message to the first server process with a server process down message;
   erasing the first entry in the process table on the first node; and
   erasing the first entry in the process tables on the other nodes.

7. The method of claim 3, further comprising:
   detecting the second server process has failed;
   determining if the second server process has a backup server process on the first node by reading entries in a region of the process table assigned to the first node, the first node controlling what is written to that region;
   if the second server process does not have a backup server process on the first node, erasing the second location in the second row of the handle table;
   if the second server process does have a backup server process on the first node:
      writing a third location of a third entry in the second row of the handle table on the first node; and
      sending a message to the backup server process to take over for the second server process.

8. The method of claim 3, further comprising:
   detecting that the second node has failed;
   reading the second entry in the process table, the second entry being located in a region of the process table assigned to the second node, the second node controlling what is written to that region;
   determining if the second entry is valid, the second entry being valid if it contains a server process name;
   if the second entry is valid, reading entries in another region of the process table assigned to the first node for a backup server process to the second server process that is located on the first node;
   if the second server process does not have a backup server process on the first node, erasing the second location in the second row of the handle table;
   if the second server process does have a backup server process on the first node:
      writing a third location of a third entry in the second row of the handle table on the first node; and
      sending a message to the backup server process to take over for the second server process.

9. The method of claim 1, further comprising:
   receiving the first server name from a client process;
   looking for the first entry storing the first server name in the process table, wherein the first entry is located at the first location in the process table;
   looking for the first row storing the first location in the handle table, wherein the first row index to the first row is the first process handle for the first server process; and providing the first process handle to the client process for communication with the first server process.

10. The method of claim 1, wherein:
the handle table comprises a first column for storing locations of primary server processes and a second column for storing locations of backup server processes; and
said writing the first location of the first entry in the first row of the handle table comprises:
  writing the first location to the first row, the first column if the first server process is a primary server process; and
  writing the first location to the first row, the second column if the first server process is a backup server process.

11. The method of claim 1, further comprising:
if the first server name is not in the entries in the process table, writing the first location of the first entry in rows of handle tables on the other nodes, wherein row indices to the rows are process handles for the first server process.

12. A computer implemented method for a name mapping module on a node in a cluster to register a server process on the node for communication with a client process in the cluster, comprising:
  (a) determining if a server name of the server process is in one of a plurality of entries of a process table on the node;
  (b) if the server name is in one of the entries of the process table, informing the server process that it cannot be registered;
  (c) if the server name is not in one of the entries of the process table, writing a new entry with the server name, a node number of the node, a process ID of the server process on the node, and a process state of the server process in (1) the process table on the node and (2) another process table on another node in the cluster;
  (d) determining again if the server name is in one of the entries excluding the new entry of the process table;
  (e) if the server name is in one of the entries excluding the new entry:
    erasing the new entry in the process table of the node and said another process table in said another node;
    repeating above actions after a timeout;
  (f) if the server name is not in one of the entries excluding the new entry:
    writing a location of the new entry in a row in a handle table, wherein a row index to the row is a process handle for the server process;
    informing the server process that the server process is registered.

13. The method of claim 12, wherein the process state of the server process is primary or backup.

14. The method of claim 12, wherein said writing the new entry in said another process table in said another node comprises writing to a region of said another process table assigned to the node, the node controlling what is written to that region.

15. A computer implemented method for a name mapping module on a node to register a server process on the node using a handle table and a process table, wherein:
the handle table comprises a plurality of rows, each of the rows storing (1) a first location of a first entry in the process table for a primary server process, and (2) a second location of a second entry in the process table for a backup server process to the primary server process, wherein row indices to the plurality of rows are process handles for a plurality of processes;
the process table comprises a plurality of memory regions assigned to respective nodes, each of the memory regions including a plurality of entries, each of the entries storing (1) a process name, (2) a node number, (3) a process ID, and (4) a process state, wherein what is written to each memory region is controlled by a respective node;
the method comprises:
  (a) determining if a server process name of the server process is in one of the entries in the process table;
  (b) if the server process name is in one of the entries, informing the server process that it cannot be registered;
  (c) if the server process name is not in one of the entries, writing a new entry with the server process name, a server node number of the node, a server process ID of the server process on the node, and a server process state of the server process in (1) a memory region of the process table in the node and (2) another memory region of another process table in another node, wherein the memory region and said another memory region are assigned to the node;
  (d) determining again if the server process name is in one of the entries excluding the new entry of the process table;
  (e) if the server process name is in one of the entries excluding the new entry:
    erasing the new entry in the process table of the node and said another process table in said another node;
    repeating above actions after a timeout;
  (f) if the server process name is not in one of the entries excluding the new entry:
    writing a location of the new entry in a row in the handle table, wherein a row index to the row is a process handle for the server process;
    informing the server process that the server process is registered.

16. The method of claim 15, wherein the server process state of the server process is primary or backup.

17. A computer implemented method for a name mapping module on a first node to handle communication between a client process at a first node and a server process at a second node, comprising:
  receiving, from the client process at the first node, a process handle and a message for the server process at the second node;
  after said receiving, mapping the process handle to a row in a handle table, the handle table being at the first node;
  after said mapping the process handle, reading the row to retrieve a location in a process table, the process table being at the first node;
  after said reading the row, mapping the location to an entry in the process table;
  after said mapping the location, reading the entry to retrieve (1) a node number of the second node, (2) a process ID of the server process on the second node, and (3) a process state of the server process;
  after said reading the entry, determining if the server process is accepting messages according to the process state; and
  if the server process is accepting messages, sending the message with the process ID to the second node.

18. The method of claim 17, wherein said mapping the process handle to a row in a handle table comprises reading a row in the handle table with a row index equal to the process handle.

19. The method of claim 17, further comprising:
if the server process is not accepting messages, determining if the server process has a backup server process; and
if the server process has a backup server process, waiting for the backup server process to take over for the server process.

20. The method of claim 17, wherein services provided by the server process is down if the server process does not have a backup server process.

21. The method of claim 17, after said sending the message, further comprising:
determining if the server process or the second node has failed;
if the server process or the second node has failed, determining if the server process has a backup server process;
if the server process has a backup server process, waiting for the backup server process to take over for the server process.

22. The method of claim 17, further comprising prior to said receiving from the client process at the first node a process handle and a message for the server process at the second node:
receiving a server name from the client process;
looking for the entry of the server process in the process table with the server name;
looking for the process handle assigned to the entry; and
providing the process handle to the client process for communication with the server process.

23. A computer implemented method for a name mapping module on a first node in a cluster to respond to a failing server process on a second node in the cluster, comprising:
detecting a server process failing on the second node;
determining if the server process has a backup server process on the first node by reading a region of a process table on the first node, the first node controlling what is written to that region of the process table, the process stable comprising process entries each having (1) a process name, (2) a process ID, and (3) a process state of a respective server process, the process state comprising one of primary and backup;
if the server process does not have a backup server process on the first node, invalidating a handle entry in a handle table on the first node, wherein:
the handle entry has (1) a first area that stores a first location of a first process entry in the process table and (2) a second area that stores a second location of a second process entry in the process table;
the first process entry stores (1) a process name, (2) a process ID, and (3) a process state of the server process;
the second process entry may store (1) a process name, (2) a process ID, and (3) a process state of the backup server process; and
the process handle for the server process comprises a row index to the handle entry;
if the server process does have a backup server process on the first node:
updating the handle entry to replace the first location with the second location in the first area so that the process handle leads to the backup server process; and
sending a message to the backup server process to take over as the server process.

24. A method for a name mapping module on a first node in a cluster to respond to a failing second node in the cluster, comprising:
reading a first process entry of a server process on the second node in a region of a process table on the first node, wherein the region is owned by the second node so the second node controls what is written to that region;
determining if the first process entry is valid, wherein the first process entry is valid if the first process entry contains a server name;
if the first process entry is valid, reading process entries of other server processes in another region of the process table for a backup server process to the server process that is located on the first node, wherein the another region is owned by the first node so the first node controls what is written to that region;
if the server process does not have the backup server process on the first node, invalidating a handle entry in a handle table on the first node, wherein:
a process handle for the server process comprises a row index to a handle entry in a handle table on the first node;
the handle entry has (1) a first area for storing a first location of the first process entry and (2) a second area for storing a second location of a second process entry in the process table;
the first process entry stores (1) a process name, (2) a process ID, and (3) a process state of the server process; and
the second process entry may store (1) a process name, (2) a process ID, and (3) a process state of the backup server process;
if the server process has the backup server process:
updating the handle entry to replace the first location with the second location in the first area so that the process handle leads to the backup server process; and
sending a message to the backup server process to take over for the server process.

25. The method of claim 24, further comprising repeating above actions for another entry of another server process in the region of the process table on the first node owned by the second node.

* * * * *